United States Patent
Baldwin et al.

(10) Patent No.: US 10,395,016 B2
(45) Date of Patent: Aug. 27, 2019

(54) COMMUNICATION PATTERN RECOGNITION

(71) Applicant: International Business Machines Corporation, Armonk, NY (US)

(72) Inventors: Timothy J. Baldwin, Wickham (GB); Andrew Johnson, Winchester (GB); Peter J. Johnson, Eastleigh (GB); Ben Sasson, Yaffo (IL); Fenglian Xu, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/413,594

(22) Filed: Jan. 24, 2017

(65) Prior Publication Data

US 2018/0211019 A1 Jul. 26, 2018

(51) Int. Cl.
*G06F 21/31* (2013.01)
*H04L 12/58* (2006.01)
*H04L 29/06* (2006.01)
*H04L 29/08* (2006.01)

(52) U.S. Cl.
CPC ........... *G06F 21/316* (2013.01); *H04L 51/04* (2013.01); *H04L 51/22* (2013.01); *H04L 63/102* (2013.01); *H04L 67/22* (2013.01); *H04L 67/306* (2013.01)

(58) Field of Classification Search
CPC ..... G06F 21/316; H04L 63/10; H04L 67/306; H04L 51/22; H04L 67/22; H04L 51/04
See application file for complete search history.

(56) References Cited

U.S. PATENT DOCUMENTS

| | | | |
|---|---|---|---|
| 5,278,901 A | 1/1994 | Shieh et al. | |
| 6,816,589 B2 | 11/2004 | Pinard | |
| 7,120,635 B2* | 10/2006 | Bhide | G06F 21/6218 |
| 7,506,371 B1* | 3/2009 | Ben-Natan | G06F 21/316 |
| | | | 726/18 |
| 8,434,128 B2 | 4/2013 | Kennedy | |

(Continued)

OTHER PUBLICATIONS

Ondrej Linda et al., "Neural Network based Intrusion Detection System for critical infrastructures", IEEE Xplore | Digital Library, http://ieeexplore.ieee.org/document/5178592/, Jul. 31, 2009, 9 pages.

*Primary Examiner* — Michael Pyzocha
(74) *Attorney, Agent, or Firm* — Kunzler Bean & Adamson

(57) ABSTRACT

For communication pattern recognition, an apparatus is disclosed. The apparatus includes a baseline analysis module that samples predefined sources associated with a user and generates a baseline fingerprint for the user. The apparatus includes an active analysis module that re-samples the predefined sources associated with the user after a predefined time interval and generates an active fingerprint for the user. The apparatus includes a verification module that compares the active fingerprint to the baseline fingerprint and determines whether the active fingerprint closely matches the baseline fingerprint. If the active fingerprint closely matches the baseline fingerprint, then the verification module replaces the baseline fingerprint with the active fingerprint. If the active fingerprint does not match the baseline fingerprint, then the verification module performs a predefined action to rectify differences between the baseline fingerprint and the active fingerprint.

18 Claims, 7 Drawing Sheets

(56) References Cited

U.S. PATENT DOCUMENTS

| | | | | |
|---|---|---|---|---|
| 8,516,104 | B1* | 8/2013 | Liu | H04L 43/16 379/133 |
| 8,959,633 | B1* | 2/2015 | Dokey | G06F 21/50 705/30 |
| 9,049,224 | B2* | 6/2015 | Lin | G06F 11/076 |
| 9,106,687 | B1* | 8/2015 | Sawhney | H04L 63/1416 |
| 9,275,345 | B1* | 3/2016 | Song | G06N 99/005 |
| 9,408,073 | B2* | 8/2016 | Schwartz | H04W 12/06 |
| 9,516,053 | B1* | 12/2016 | Muddu | H04L 63/1425 |
| 9,565,203 | B2* | 2/2017 | Bernstein | H04L 63/1441 |
| 2002/0026591 | A1* | 2/2002 | Hartley | G06Q 30/06 726/25 |
| 2007/0094711 | A1* | 4/2007 | Corley | G06F 21/53 726/3 |
| 2009/0006856 | A1* | 1/2009 | Abraham | G06F 21/55 713/183 |
| 2010/0005518 | A1* | 1/2010 | Tirpak | H04L 67/306 726/6 |
| 2011/0307434 | A1* | 12/2011 | Rostampour | G06Q 10/107 706/45 |
| 2013/0111019 | A1* | 5/2013 | Tjew | G06F 15/18 709/224 |
| 2014/0165140 | A1* | 6/2014 | Singla | G06F 11/3006 726/1 |
| 2014/0244563 | A1* | 8/2014 | Atomori | G06F 11/008 706/46 |
| 2015/0074746 | A1* | 3/2015 | Kohno | H04L 63/0823 726/1 |
| 2015/0082326 | A1* | 3/2015 | Milliron | G06F 9/542 719/318 |
| 2015/0242486 | A1 | 8/2015 | Chari et al. | |
| 2015/0301579 | A1* | 10/2015 | Vaccari | G06F 1/3215 713/340 |
| 2016/0021081 | A1* | 1/2016 | Caceres | H04L 63/08 726/7 |
| 2016/0112397 | A1* | 4/2016 | Mankovskii | H04L 63/105 726/6 |
| 2016/0234595 | A1* | 8/2016 | Goran | H04R 3/002 |
| 2016/0300049 | A1* | 10/2016 | Guedalia | G06F 21/316 |
| 2016/0308865 | A1* | 10/2016 | Poli | H04L 63/0876 |
| 2016/0328561 | A1* | 11/2016 | Tamir | G06F 21/566 |
| 2017/0078322 | A1* | 3/2017 | Seiver | H04L 43/0876 |
| 2017/0111381 | A1* | 4/2017 | Jones | H04L 63/1425 |
| 2017/0126710 | A1* | 5/2017 | De-Levie | H04L 63/1425 |
| 2017/0262758 | A1* | 9/2017 | Boyapalle | G06N 99/005 |
| 2017/0295197 | A1* | 10/2017 | Parimi | H04L 63/10 |
| 2017/0372031 | A1* | 12/2017 | Nuria | G06Q 50/22 |
| 2018/0027006 | A1* | 1/2018 | Zimmermann | H04L 63/1425 |
| 2018/0039555 | A1* | 2/2018 | Salunke | G06F 11/3409 |
| 2018/0184157 | A1* | 6/2018 | Newell | H04N 21/442 |
| 2018/0241761 | A1* | 8/2018 | Bania | H04L 63/0272 |
| 2018/0255102 | A1* | 9/2018 | Ward | H04L 63/10 |

* cited by examiner

COMMUNICATION PATTERN RECOGNITION

FIELD

The subject matter disclosed herein relates to a system, an apparatus, and a method for communication pattern recognition.

BACKGROUND

In some organizations, employees often move between multiple roles and/or projects under a same department and/or manager. However, in such cases, this may result in individual users having to request additional permissions for new assignments and/or projects, while retaining older permissions. These older permissions may build up and then need to be cleaned up. Further, when users move to different job roles, their contacts and patterns of work-related communications may also have changes. Therefore, in these role change situations, network administrators may be unaware of such transitions and may be powerless in identifying moments when permissions are no longer needed.

Some solutions for managing permissions rely on trust (e.g., maintaining older permissions, while trusting users not to access what they no longer need), a periodic "keep alive" (e.g., yearly re-apply or notification to withdraw), and/or constantly having to manage these permissions manually, which may be a significant burden on resources. For instance, mismanagement of user permissions can evolve into high overhead costs for network administrators, which can inhibit or prevent them from spending time on other more important tasks. Further, in some instances, managing user permissions manually can result in human errors, which can lead to reduced productivity and/or higher security risks.

BRIEF SUMMARY

An apparatus for communication pattern recognition is disclosed. In one embodiment, the apparatus includes a baseline analysis module that samples predefined sources associated with a user and generates a baseline fingerprint for the user based on results of sampling the predefined sources. The apparatus includes an active analysis module that re-samples the predefined sources associated with the user after a predefined time interval and generates an active fingerprint for the user based on results of re-sampling the predefined sources. The apparatus includes a verification module that compares the active fingerprint to the baseline fingerprint and determines if the active fingerprint closely matches the baseline fingerprint. If the active fingerprint matches the baseline fingerprint, then the verification module replaces the baseline fingerprint with the active fingerprint. If the active fingerprint does not match the baseline fingerprint, then the verification module performs a predefined action to rectify differences between the baseline fingerprint and the active fingerprint.

A method for communication pattern recognition is disclosed. In one embodiment, the method includes sampling predefined communication sources associated with a user and generating a baseline fingerprint for the user based on results of sampling the predefined communication sources. The method includes re-sampling the predefined communication sources associated with the user after a predefined time interval and generating an active fingerprint for the user based on results of re-sampling the predefined communication sources. The method includes comparing the active fingerprint to the baseline fingerprint to determine whether the active fingerprint closely matches the baseline fingerprint. The method includes replacing the baseline fingerprint with the active fingerprint, if the active fingerprint matches the baseline fingerprint. The method includes performing a predefined action to rectify differences between the baseline fingerprint and the active fingerprint, if the active fingerprint does not match the baseline fingerprint.

A computer program product that performs the functions of the method is disclosed. In one embodiment, the computer program product includes computer readable storage media having program instructions embodied therewith, the program instructions are readable/executable by a processor to cause the processor to sample predefined communication sources associated with a user and generate a baseline fingerprint for the user based on results of sampling the predefined communication sources. The program instructions cause the processor to re-sample the predefined communication sources associated with the user after a predefined time interval and generate an active fingerprint for the user based on results of re-sampling the predefined communication sources. The program instructions cause the processor to compare the active fingerprint to the baseline fingerprint to determine whether the active fingerprint closely matches the baseline fingerprint. The program instructions cause the processor to replace the baseline fingerprint with the active fingerprint, if the active fingerprint matches the baseline fingerprint. The program instructions cause the processor to perform a predefined action to rectify differences between the baseline fingerprint and the active fingerprint, if the active fingerprint does not match the baseline fingerprint.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
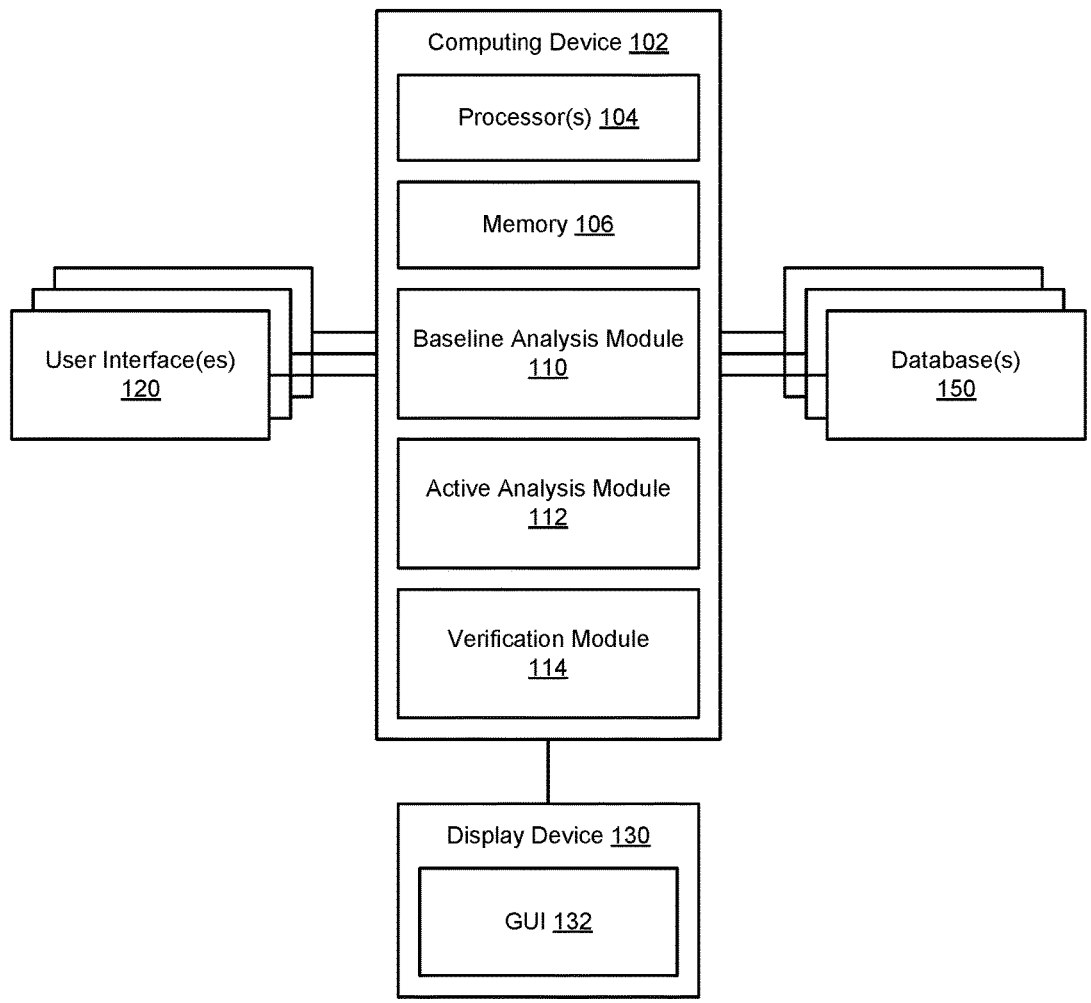
FIG. 1 is a block diagram illustrating one embodiment of an apparatus for implementing communication pattern recognition.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a block diagram illustrating one embodiment of an apparatus 100 that utilizes a computing device 102 for implementing communication pattern recognition with various methods and techniques associated therewith.

In reference to FIG. 1, the apparatus 100 may be implemented as a system having the computing device 102 purposed for communication pattern recognition, thereby transforming the computing device 102 into a special purpose machine dedicated to the implementation of communication pattern recognition, as described herein. Therefore, the computing device 102 may include standard element(s) and/or component(s), including at least one processor(s) 104, memory 106 (e.g., non-transitory computer-readable storage medium), peripherals, power, and various other computing elements and/or components that are not specifically shown in FIG. 1. Further, as shown in FIG. 1, the apparatus 100 may be associated with a display device 130 (e.g., a monitor or other display) that may be used to provide a graphical user interface (GUI) 132. In some instances, the GUI 132 may be used to receive input from a user (e.g., user input) associated with communication pattern recognition. In other instances, one or more other user interfaces (UI) 120 (e.g., one or more other computing devices having GUIs or similar) may be used to receive input from one or more other users (e.g., other user input) associated with communication pattern recognition. The apparatus 100 may also be associated with one or more databases (e.g., database(s) 150) that may be configured to store data and information related to the users including messages and communication pattern data associated with the users. In various implementations, the one or more databases 150 may include data and information related to various types of predefined communication sources including, e.g., one or more of an organization email system, an instant messaging history, web server logs, and online based communications, such as, e.g., voice-over Internet protocol (VOIP).

Accordingly, the apparatus 100 may thus include the computing device 102 and instructions recorded on the computer-readable medium 106 (or one or more databases 150) and executable by the at least one processor 104. The apparatus 100 may be utilized to monitor and identify changes in an individual user's communication pattern to assist with network administration efforts, including changing roles, assigning permissions, revoking permissions, and/or similar. Further, the apparatus 100 may include the display device 130 for providing output to a user, and the display device 130 may include the GUI 132 for receiving input from the user. Still further, one or more UIs 120 may be used for providing output to other users and receiving input from the other users.

The computing device 102 may include one or more modules, such as, e.g., a baseline analysis module 110. In some scenarios, the baseline analysis module 110 may be used to sample predefined sources associated with a user and generate a baseline fingerprint for the user based on results of sampling the predefined sources. The baseline fingerprint may be embodied as an initial fingerprint that may include a sum of archived communications associated with the user. The baseline fingerprint may include data and information related to message timestamps, content, recipients, and/or frequency. Further, the predefined sources may include predefined communication sources, such as, e.g., an organization email system, an instant messaging history, web server logs, and online based communications, such as, e.g., VOIP. In some instances, sampling the predefined sources associated with the user may include sampling data and information in archived messages associated with the user.

The computing device 102 may include an active analysis module 112. In some scenarios, the active analysis module 112 may be used to re-sample the predefined sources associated with the user after a predefined time interval and generate an active fingerprint for the user based on results of re-sampling the predefined sources. The active analysis module 112 may generate the active fingerprint while maintaining the baseline fingerprint. Sometimes, the active analysis module 112 may be used to monitor a user's personal communications. The predefined time interval may include any predefined period of time, such as, e.g., a number of seconds, minutes, days, weeks, or months. Further, the predefined time interval may be adjustable depending on communication volume. In some cases, re-sampling the predefined sources associated with the user may include re-sampling data and information in recent messages associated with the user.

The computing device 102 may include a verification module 114. In some scenarios, the verification module 114 may be used to compare the active fingerprint to the baseline fingerprint and determine whether the active fingerprint closely (or substantially) matches the baseline fingerprint. For instance, if the active fingerprint closely matches the baseline fingerprint, then the verification module 114 may replace the baseline fingerprint with the active fingerprint. In this instance, the verification module 114 may replace the baseline fingerprint by updating the baseline fingerprint with data and information related to the active fingerprint to thereby generate an up-to-date baseline fingerprint. Further, in some cases, the baseline fingerprint may be replaced when a close (or substantially close) match exists or is discovered so as to allow for minor variations in patterns over time.

Otherwise, in another instance, if the active fingerprint does not match the baseline fingerprint, then the verification module 114 may perform a predefined action to rectify differences between the baseline fingerprint and the active fingerprint. For instance, in some cases, the predefined action may include asking the user to re-validate permissions associated with the baseline fingerprint for the user. In other cases, the predefined action may include asking the user to temporarily revoke permissions associated with the baseline fingerprint for the user. In some other cases, the predefined action may include asking the user (or network administrator) to find one or more other users having a similar baseline fingerprint and suggesting the user apply permissions related to the one or more other users to the baseline fingerprint for the user. Various other types of predefined actions may also be performed.

In accordance with various methods and techniques described herein, the computing device 102 may include one or more modules for utilizing various changes in an individual user's communication pattern to trigger various network administration tasks by continuously comparing an active (or live) communication fingerprint over a period of time with a baseline fingerprint. The one or more modules may be further used for defining the baseline fingerprint as a comparable value assigned to the individual user based on one or more or all analyzed communications related to the baseline fingerprint. In some cases, the individual user's baseline fingerprint may be embodied as the individual user's initial fingerprint calculated upon system initialization.

In reference to FIG. 1, the apparatus 100 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the apparatus 100 of FIG. 1 may be included as well even though such standard and/or conventional elements are not illustrated explicitly, for the sake of clarity and convenience.

Figure 2:
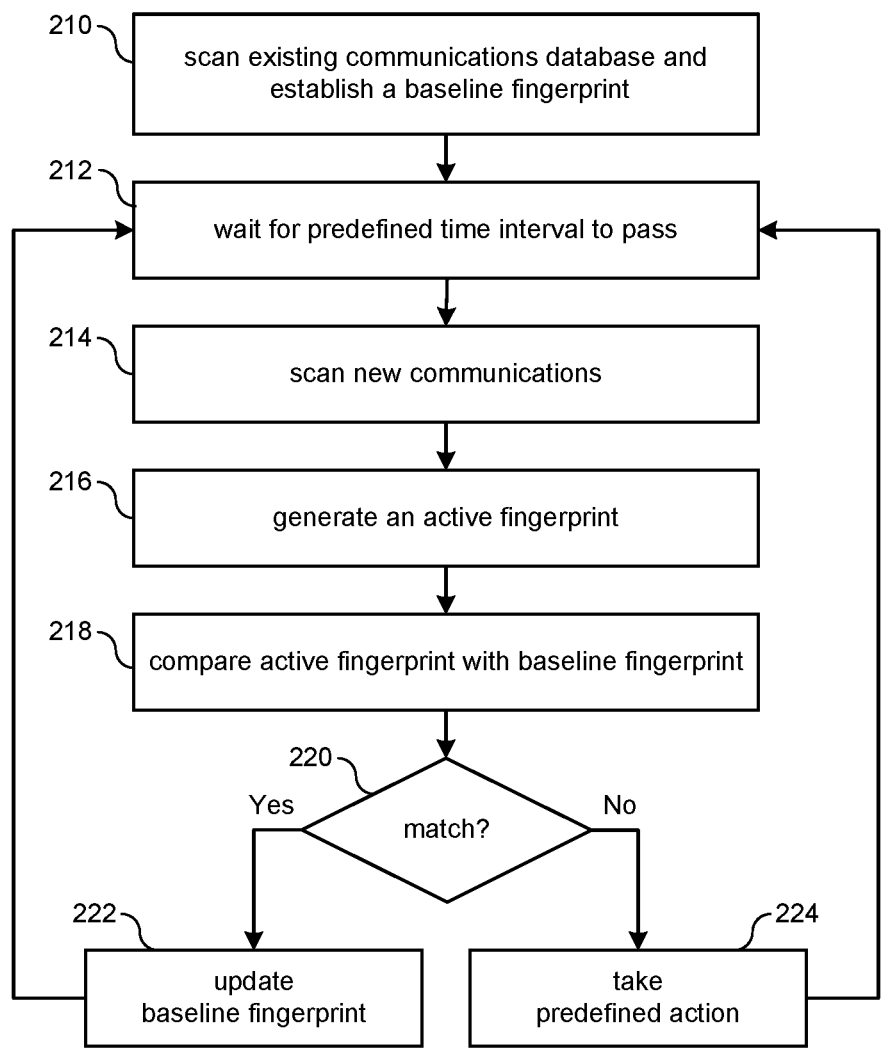
FIG. 2 is a process flow diagram illustrating one embodiment of a method for implementing communication pattern recognition.

FIG. 2 is a process flow diagram illustrating one embodiment of a method 200 for implementing communication pattern recognition. In some implementations, the method 200 may utilize changes in an individual user's communication pattern to trigger network administration tasks. This may be achieved by continuously comparing an active (or live) communication fingerprint related to the user with a known baseline fingerprint that has been established for the user. In some instances, a fingerprint may be defined as a comparable value that is assigned to an individual user based on one or more or all analyzed communications related to the fingerprint. Further, a baseline fingerprint may refer to the individual user's initial fingerprint that is calculated upon system initialization.

The method 200 and/or processes related thereto may begin with creating or generating a baseline fingerprint for a user. For instance, in block 210, the method 200 may scan a database, such as, e.g., an existing communications database, and establish a baseline fingerprint for the user. In some cases, this may be achieved by analyzing one or more or all predefined sources (e.g., organization email system, instant messaging history, web server logs, VOIP, and/or similar). The baseline fingerprint may include message timestamps, content, recipients, and/or frequency. The baseline fingerprint may refer to an initial fingerprint, and the baseline fingerprint may be a sum of one or more or all the user's known communications up until the point or creation or generation.

Later, a predefined time interval (e.g., minutes-hours, days-week, months-years, etc.) may be established for changing, altering, or adjusting the baseline fingerprint for the user depending on the communication volume of the user. For instance, in block 212, the method 200 may wait for a predefined time interval to pass.

Once the predefined time interval has passed, the predefined sources may be re-sampled for new or current communications and/or messages related to the user, and a new or active fingerprint may be generated for the user. The new or active fingerprint may be referred to as a live fingerprint. For instance, in block 214, the method 200 may scan new or current communications, and in block 216, the method 200 may generate a new or active fingerprint for the user based on the results of re-sampling the new or current communications related to the user.

Once the active fingerprint for the user has been generated, then the method 200 may compare the baseline and active fingerprints for the user. For instance, in block 218, the method 200 may compare the active fingerprint to the baseline fingerprint. Next, in decision block 220, the method 200 may determine whether a close match exists between the active fingerprint and the baseline fingerprint. For instance, if the active fingerprint closely matches the baseline fingerprint, then in block 222, the method 200 may update the baseline fingerprint with the active fingerprint. In some cases, if the active fingerprint closely matches the baseline fingerprint, then the baseline fingerprint may be updated with new data thereby creating an up-to-date baseline fingerprint. Once the baseline fingerprint has been updated, the method 200 may return to block 212 to wait for the predetermined time interval to pass before scanning or re-scanning new communications prior to further updates. However, in some cases, after updating the baseline fingerprint, the method 200 may return to block 210 instead of block 212. Otherwise, if the active fingerprint does not match (or is different than) the baseline fingerprint, then in block 224, the method 200 may take (or perform) a predefined action.

The predefined action may include updating the baseline fingerprint or not. In some examples, the predefined action may include asking the user to re-validate their permissions or temporarily revoking some of the user permissions. In other examples, the predefined action may include finding other users with similar fingerprints and suggesting to apply their permissions to the user in question. Further, the predefined action may include notifying (or alerting) a network administrator that permissions (e.g., access and role changes) for a specific user may need to be updated. In some implementations, some form of fuzzy logic may be used to determine whether an update is warranted or not.

Figure 3A:
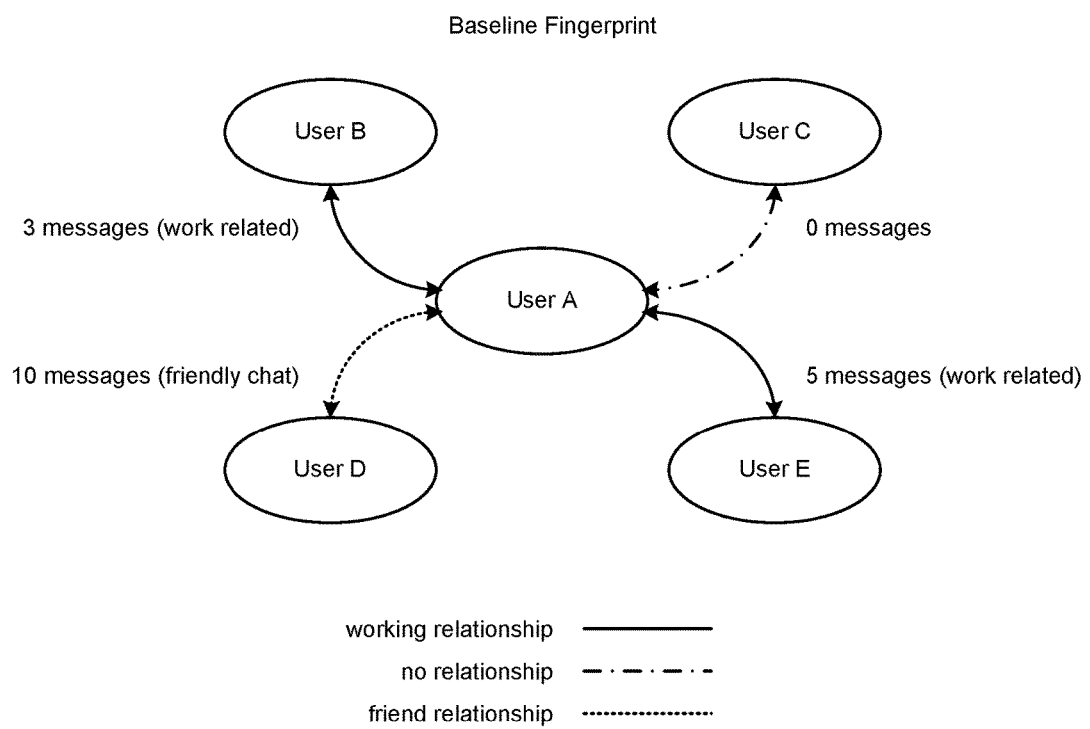
FIGS. 3A-3C are block diagrams illustrating various example scenarios for implementing communication pattern recognition.
Figure 3B:
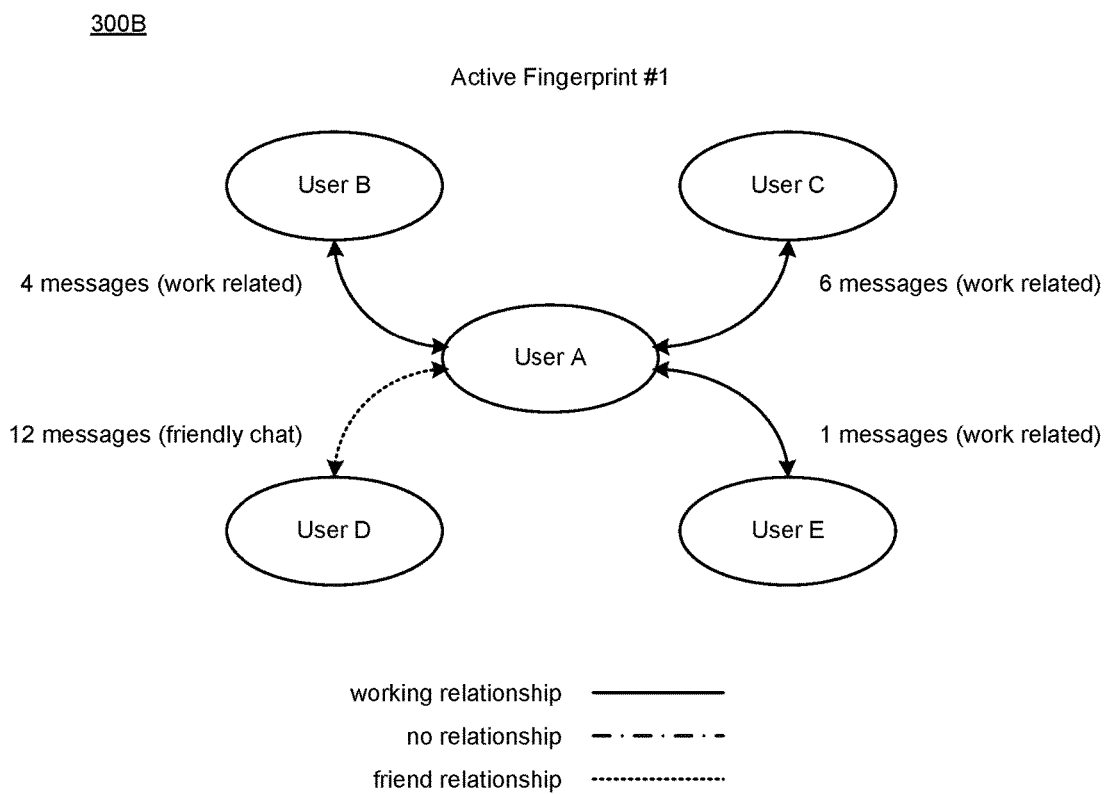
Figure 3C:
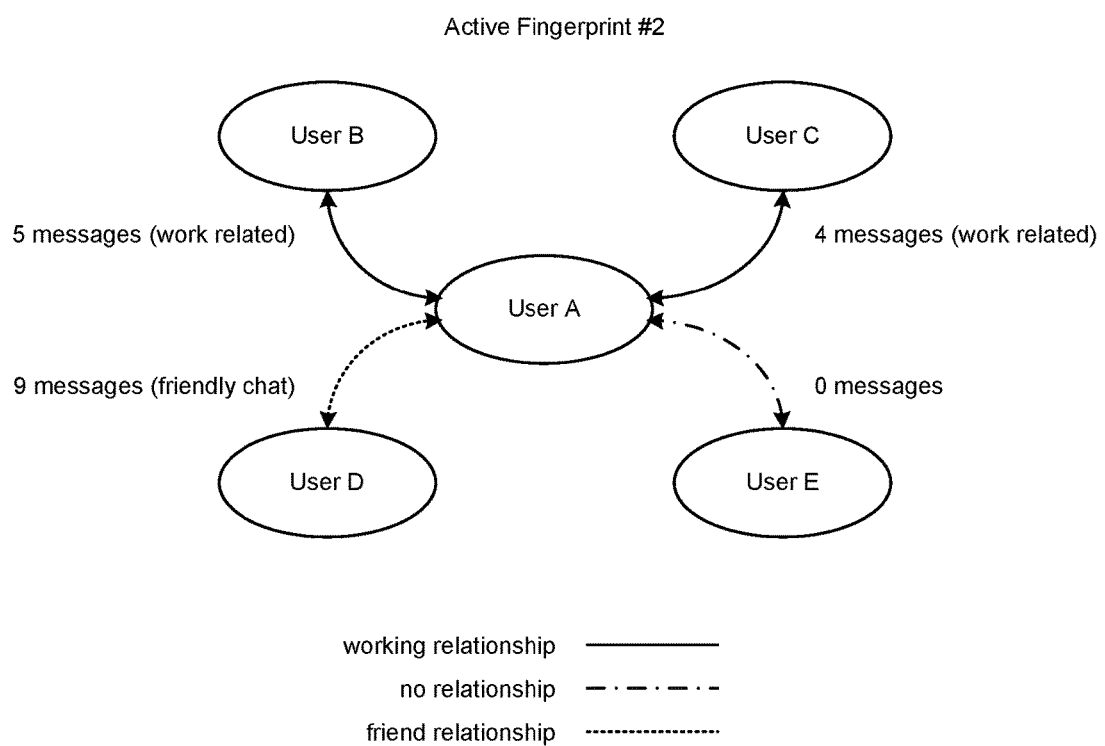

FIGS. 3A-3C are block diagrams illustrating various example scenarios for implementing communication pattern recognition using various techniques described herein. For instance, in various implementation scenarios, FIGS. 3A-3C illustrate various examples of detecting changes in a user's personal communications. In these examples, a first user is working with several other users in an organization, but is now shifting towards working with one or more other users. These transition scenarios may indicate that some permissions may no longer be needed to work on projects that user E is working, but some other permissions may be needed for projects that user C is working.

In particular, FIG. 3A illustrates generation of a baseline fingerprint for User A. In this scenario, User A has a working relationship with User B and User E. As shown, multiple work related messages (e.g., 3) exist between User A and User B, and multiple work related messages (e.g., 5) exist between User A and User E. Further, in this scenario, User A has no relationship with User C, because no messages exist between User A and User C. Still further, in this scenario, User A has a friend relationship with User D, because 10 friendly chat messages exist between User A and User D. Thus, in this scenario, User A may gain permissions related to working with User B and User E.

FIG. 3B illustrates generation of a first active fingerprint for User A. In this scenario, User A still has a working relationship with User B, User A has started working with User C, and User A is working much less with User E. As shown, multiple work related messages (e.g., 4) exist between User A and User B, multiple work related messages (e.g., 6) exist between User A and User C, and one work related message exists between User A and User E. Further, in this scenario, User A still has a friend relationship with User D, because 12 friendly chat messages exist between User A and User D. Thus, in this scenario, User A may gain permissions related to working with User C, while maintaining permissions related to working with User B and User E. Therefore, in this scenario, a role change may occur for User A and for User C, while maintaining roles associated with User B and User E. In some cases, the role change may trigger an administrator to verify permissions for User A and/or for each of the Users B, C, and E.

FIG. 3C illustrates generation of a second active fingerprint for User A. In this scenario, User A still has a working relationship with User B, User A continues working with User C, and User A is no longer working with User E. As shown, multiple work related messages (e.g., 5) exist between User A and User B and multiple work related messages (e.g., 4) exist between User A and User C. Further, in this scenario, User A has no relationship with User E, because no messages exist between User A and User E. Still further, in this scenario, User A still has a friend relationship with User D, because 9 friendly chat messages exist between User A and User D. Thus, in this scenario, User A may lose permissions related to working with User E, while maintaining permissions related to working with User B and User C. Therefore, in this scenario, a role change may occur for User A and for User E, while maintaining roles associated with User B and User C. For instance, a role may refer to a permission or a task that is associated with one or more users, such as, e.g., User A. Further, in some instances, a role change may occur for User A due to a relationship change between User A and User E. In some cases, the role change may trigger an administrator to verify permissions for User A and/or for each of the Users B, C, and E.

In various implementations, the methods and techniques described herein provide for recognizing communication patterns among multiple users, which may include tracking personal communications of multiple users to identify patterns, including work related patterns, friendship related patterns, and no related patterns. Further, the methods and techniques described herein may provide for monitoring content of messages between multiple users along with metadata associated with those messages.

Figure 4:
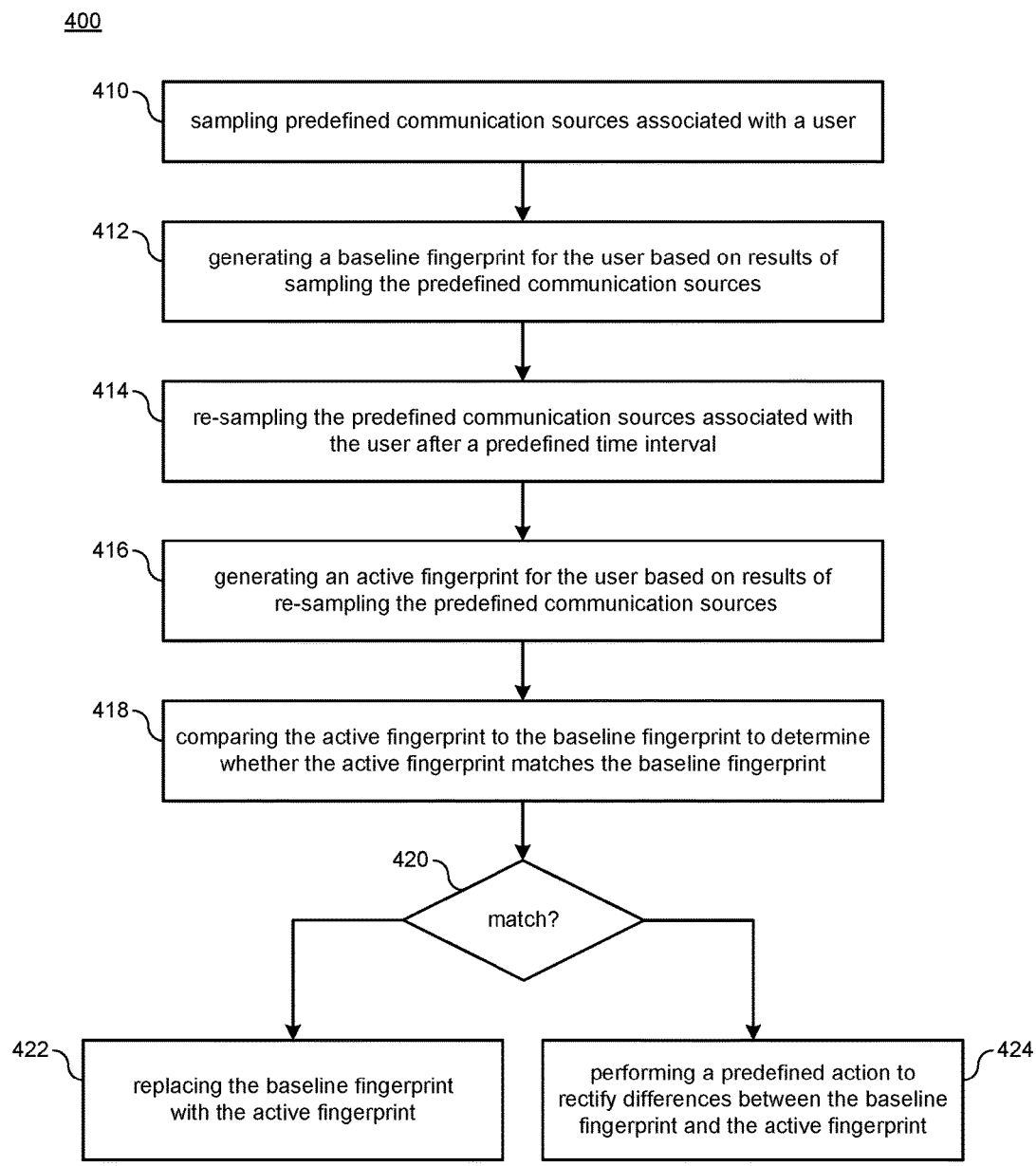
FIG. 4 is a process flow diagram illustrating one embodiment of another method for implementing communication pattern recognition.

FIG. 4 is a process flow diagram illustrating one embodiment of another method 400 for implementing communication pattern recognition. For instance, in block 410, the method 400 may sample predefined sources associated with a user. In some cases, the predefined sources may include various predefined communication sources including one or more of an organization email system, an instant messaging history, web server logs, and online based communications, such as, e.g., VOIP. In block 412, the method 400 may generate a baseline fingerprint for the user based on results of sampling the predefined communication sources.

In block 414, the method 400 may re-sample the predefined communication sources associated with the user after a predefined time interval. The predefined time interval may include a number of seconds, minutes, days, weeks, or months. In block 416, the method 400 may generate an active fingerprint for the user based on results of re-sampling the predefined communication sources.

In block 418, the method 400 may compare the active fingerprint to the baseline fingerprint to determine whether the active fingerprint closely (or substantially) matches the baseline fingerprint. In decision block 420, the method 400 may determine whether the active fingerprint closely matches the baseline fingerprint. In block 422, the method 400 may replace the baseline fingerprint with the active fingerprint, if the active fingerprint closely matches the baseline fingerprint. Otherwise, in block 424, the method 400 may perform a predefined action to rectify differences between the baseline fingerprint and the active fingerprint, if the active fingerprint does not match the baseline fingerprint.

In some cases, the predefined action may include asking the user to re-validate permissions associated with the baseline fingerprint for the user. In other cases, the predefined action may include asking the user to temporarily revoke permissions associated with the baseline fingerprint for the user. In some other cases, the predefined action may include asking the user to find one or more other users having a similar baseline fingerprint and suggesting the user apply permissions related to the one or more other users to the baseline fingerprint for the user.

Figure 5:
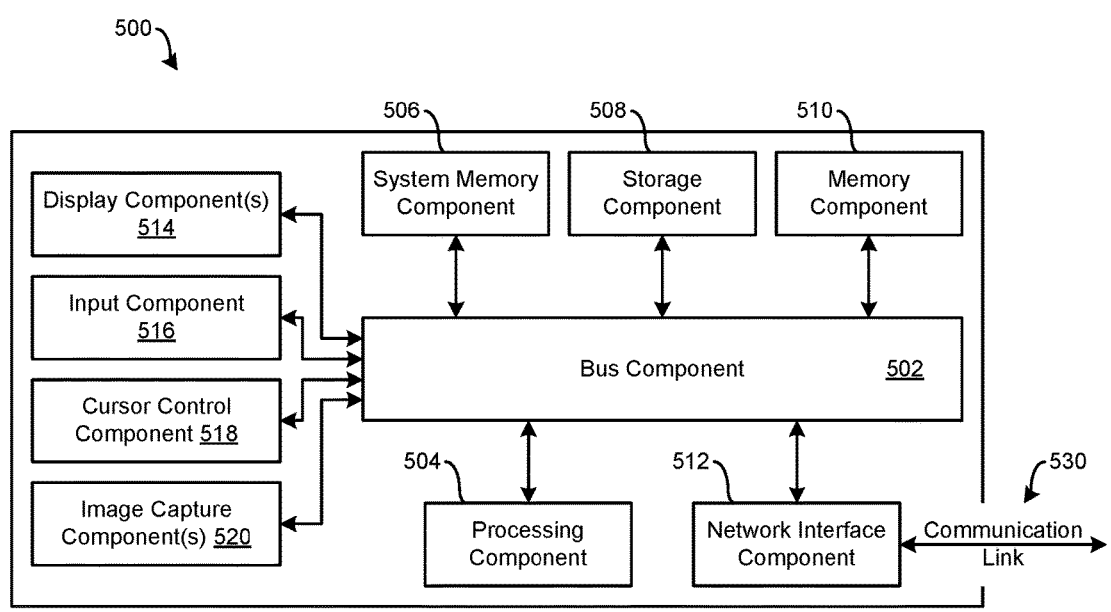
FIG. 5 is a block diagram illustrating one embodiment of a computing device for implementing communication pattern recognition.

FIG. 5 shows a block diagram illustrating one embodiment of a computing device 500 suitable for implementing communication pattern recognition methods and techniques, including components of an apparatus, such as, e.g., the computing device 102 and the one or more UIs 120. In some implementations, the computing device 102 may have a communication network component that may be capable of communicating over a wired and/or wireless network with various other network computing devices, such as, e.g., the one or more UIs 120 in a peer-to-peer network. Therefore, it should be appreciated that the computing device 102 may be implemented as the computing device 500 for network computing and communication in a manner as follows.

In accordance with embodiments of the disclosure, the computer system 500 includes a bus 502 and/or other communication mechanism for communicating data and information, which interconnects subsystems and components, including processing component 504 (e.g., processor, micro-controller, digital signal processor (DSP), etc.), system memory component 506 (e.g., RAM), static storage component 508 (e.g., ROM), memory component 510 (e.g., magnetic), network interface component 512 (e.g., modem or Ethernet card), one or more display components 514 (e.g., LCD), input component 516 (e.g., keyboard, push-buttons), cursor control component 518 (e.g., slider), and one or more image capture components 520 (e.g., one or more digital cameras). In one implementation, the memory component 510 may comprise one or more databases having one or more flash drive components, disk drive components, or similar.

In accordance with various embodiments of the disclosure, the computer system 500 may perform specific operations by the processor 504 executing one or more sequences of one or more instructions contained in system memory component 506. Such instructions may be read into the system memory component 506 from another computer readable medium, such as static storage component 508 or memory component 510. In other embodiments, hard-wired circuitry may be used in place of or in combination with software instructions to implement the disclosure.

Logic may be encoded in a computer readable medium, which may refer to any medium that participates in providing instructions to processor 504 for execution. Such a medium may take many forms, including but not limited to, non-volatile media and volatile media. In some implementations, non-volatile media includes optical or magnetic disks, such as memory component 510, and volatile media includes dynamic memory, such as system memory component 506. In some implementations, data and information related to execution instructions may be transmitted to computer system 500 via a transmission media, such as in the form of acoustic or light waves, including those generated during radio frequency (RF) waves, infrared (IR) data communications, and/or microwave (MW) communication. In various implementations, transmission media may include coaxial cables, copper wire, and/or fiber optics, including wires that comprise bus 502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by computer system 500. In various other embodiments of the disclosure, a plurality of computer systems 500 coupled by communication link 530 (e.g., a LAN, WLAN, PTSN, and/or various other wired or wireless networks, including telecommunications, mobile, and cellular phone networks) may perform instruction sequences to practice implementations of the disclosure in coordination with one another.

In various embodiments of the disclosure, the computer system 500 may transmit and receive messages, data, information, and instructions, including one or more programs (i.e., application code) through a communication link 530 and a communication interface 512. Further, received program code may be executed by the processor 504 as received and/or stored in the memory component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
one or more processors;
a network interface whereby the one or more processors communicate with a network; and
a memory storing code that is executable by the one or more processors to:
generate a baseline network communications fingerprint for a first user, based on network communication pattern data for communications between the user one or more second users and sampled at a first point in time from one or more databases that archive network communication pattern data from a set of predefined sources;
generate an active network communications fingerprint for the first user based on a re-sampling of the predefined sources after a predefined time interval; and
perform a predefined action to update a network permission in response to differences detected between the baseline network communication fingerprint and the active network communication fingerprint for the first user, wherein the predefined action includes communicating a message to a network administrator to apply network permissions to the first user based on similarity between the first user's baseline network communication fingerprint and the baseline network communication fingerprint of the one or more second users.

2. The apparatus of claim 1, wherein the one or more processors generate the baseline network communication fingerprint upon system initialization based on a sum of archived network communication data associated with the first user up until the point of generation.

3. The apparatus of claim 1, wherein the network communications pattern data relates to one or more of message timestamps, message contents, message recipients, and message frequency.

4. The apparatus of claim 1, wherein the predefined sources comprise predefined communication sources including one or more of an organization email system, an instant messaging history, and online voice communications.

5. The apparatus of claim 1, wherein the re-sampling of the predefined sources associated with the first user include information from recent messages in a predefined time interval.

6. The apparatus of claim 1, wherein the one or more processors generate the active network communications fingerprint while maintaining the baseline network communications fingerprint.

7. The apparatus of claim 1, wherein the predefined time interval comprises a number of seconds, minutes, days, weeks, or months.

8. The apparatus of claim 1, wherein the one or more processors adjust the predefined time interval based on a communication volume between the first user and the one or more second users.

9. The apparatus of claim 1, wherein the one or more processors verification module replaces the baseline fingerprint by updating the baseline fingerprint with the active fingerprint to thereby generate an up-to-date baseline fingerprint.

10. The apparatus of claim 1, wherein the predefined action to update the network permission includes communicating a request to the first user to re-validate permissions associated with the baseline network communication fingerprint for the first user.

11. The apparatus of claim 1, wherein the predefined action to update the network permission includes communicating a request to a network administrator to temporarily revoke permissions associated with the baseline network communication fingerprint for the first user.

12. A method, comprising:
generating a baseline network communications fingerprint for a first user based on network communication pattern data for communications between the user one or more second users and sampled at a first point in time from one or more databases that archive network communications pattern data from a set of predefined communication sources;
generating an active network communications fingerprint for the first user based on a re-sampling of the pre-defined communication sources after a predetermined time interval; and
performing a predefined action to update a network permission in response to differences detected between the baseline network communications fingerprint and the active network communication fingerprint for the first user, wherein the predefined action includes communicating to at least one of a network administrator and the first user, one or more network permissions for the one or more second users who have a similar baseline fingerprint to the baseline fingerprint for the first user.

13. The method of claim 12, wherein the predefined communication sources comprise one or more of an organization email system, an instant messaging history, and online voice communications.

14. The method of claim 12, wherein the predefined time interval comprises a number of seconds, minutes, days, weeks, or months.

15. The method of claim 14, further comprising adjusting the predefined time interval based on a communication volume between the first user and the one or more second users.

16. The method of claim 12, wherein the predefined action includes communicating a request to the user to re-validate permissions associated with the baseline network communications fingerprint for the first user.

17. The method of claim 12, wherein the predefined action includes communicating a request to a network administrator to temporarily revoke permissions associated with the baseline fingerprint for the first user.

18. A computer program product for performing a network permission action, the computer program product comprising a computer-readable medium having program instructions embodied therewith, the program instructions executable by a processor to:
generate, by processor, a baseline fingerprint for the first user based on network communication pattern data for communications between the first user and one or more second users and sampled at a first point in time from one or more databases that archive network communication pattern data from a set of predefined communication sources;
generate, by processor, an active fingerprint for the first user based on re-sampling the predefined communication sources;
perform, by processor, a predefined action related to a network permission in response to differences detected between the baseline network communications fingerprint and the active network communications fingerprint for the first user, wherein the predefined action includes communicating to at least one of a network administrator and the first user, one or more network permissions for the one or more second users who have a similar baseline fingerprint to the baseline fingerprint for the first user.

* * * * *